Patented Oct. 14, 1941

2,259,419

UNITED STATES PATENT OFFICE 2,259,419

WELL DRILLING

Dana G. Hefley and John G. Staudt, Tulsa, Okla., assignors to The Dow Chemical Company, Midland, Mich., a corporation of Michigan No Drawing. Application October 23, 1937, Serial No. 170,626

5 Claims. (Cl. 252—8.5)

This invention relates to methods of drilling wells, and more particularly concerns drilling fluids to be used in connection with such methods.

It is customary in drilling oil and gas wells, for example, to circulate around the drill in the bore a drilling fluid consisting of mud and water which serves to carry the bit cuttings out of the bore and to form a lining of mud on the walls of the bore. This lining prevents the walls from caving and also renders the bore substantially impermeable to the infiltration of extraneous fluids. However, the use of the conventional drilling mud has never been entirely satisfactory, due to the fact that the mud not only penetrates and seals the formations producing undesirable fluids but also the formations from which it is desired to obtain production. That this plugging presents a serious problem is evidenced by the fact that, when the major producing zone is reached, it is often necessary to withdraw all the mud fluid from the bore and to drill in, using an expensive specially constructed pressure head on the well, and oil instead of mud as a drilling fluid. Such procedure besides being relatively costly has the disadvantage that it results in mudding off any intermediate producing strata drilled through in reaching the major producing stratum.

One of the objects of this invention is to provide a drilling fluid that will form a suitable well bore linings, yet will not so penetrate the formations being drilled through as to permanently plug them. Another object is to provide a drilling fluid that will effectively seal the fluid producing formations encountered while drilling, and have certain characteristics that will enable it to be removed easily from the formation subsequently, thereby restoring fluid flow into the well unhindered by mud effects. Still other objects and advantages will be apparent as the description of the invention proceeds.

We have now found that the above objects may be attained, if, instead of the conventional drilling mud, there is supplied to the drill an organic jellifying material either in water alone or in ordinary drilling muds. The term "organic jellifying material" used herein and in the appended claims means an organic material capable of being dispersed or dissolved in water to make a mobile liquid dispersion or solution, which liquid forms a jelly after a time. We have found that such materials not only function well to carry the cuttings away from the bit but also produce a good wall lining which can be readily removed when desired. Suitable organic jellifying materials for the purpose are the carbohydrates and proteins that are capable of forming jellies when mixed with water and allowed to stand at temperatures encountered in the earth formation. Suitable carbohydrates are obtainable as by-products of starch manufacture. Other suitable organic jellifying materials may be prepared from starches and polysaccharides in the following manner: A quantity of a starch, such as that of cassava, rice, or arrowroot, is mixed with water to form a thin paste and boiled until the starch is cooked or hydrolyzed. The cooked product is dried and then ground to a powder. The powder, when mixed with water in suitable proportions, e. g. from 1-5 parts of the powder to 99-95 parts of water, forms a dispersion which readily jellifies on standing.

In carrying out the invention drilling fluids, having non-penetrating characteristics and yet capable of forming a suitable wall lining which may be easily removed when desired, may be made by incorporating in conventional mud laden fluids between about 5 and 50 per cent by volume of an aqueous dispersion containing from 1.0 to 5.0 per cent by weight of an organic jellifying material. Other methods of combining the jellifying material with the mud may be used if desired, for example, the jellifying material may be added directly to the mud slurry and the mixture afterwards diluted with water until the proper consistency is obtained. Also a satisfactory drilling fluid may be made by mixing between about 1.0 and 5.0 per cent of the jellifying material with water alone. Such mixture is relatively thick and will carry the bit cuttings out of the well satisfactorily as well as form a substantially impermeable sheath or lining in the well bore.

These drilling fluids comprising an organic jellifying material may be weighted, if necessary, for use in drilling through strata having such high fluid pressures as would blow the column of unweighted fluid out of the bore. Weighting may be accomplished by adding to the drilling fluid any of the commonly used weighting agents, such as calcium chloride, iron oxide, or barytes, to provide a mixture having the desired specific gravity.

As an illustration of the non-penetrating characteristics of a clay mud drilling fluid containing an organic jellifying material, a conventional clay drilling mud weighing 76.8 pounds per cubic foot was secured from the pit of a well being drilled, and the following tests conducted on porous oil-bearing cores of similar permeability. The cores were placed in an apparatus suitable for use in measuring fluid flow through them at varying pressures. At 100 pounds pressure liquid was observed to flow through the core treated with a conventional drilling mud while the core treated in a similar manner with the improved drilling fluid comprised of 75 per cent by volume of conventional mud slurry and 25 percent by volume of an aqueous dispersion containing 2 per cent of organic jellifying material allowed no liquid to seep through. Application of sufficient fluid pressure at the end opposite to the one so treated caused substantially normal fluid flow to be re-established through the core treated with the improved drilling fluid while the flow of fluid through the core treated with the conventional mud could not be restored by application of even much higher pressures. Repeated tests of this nature gave similar results. Similar tests conducted at pressures of several thousand pounds per square inch indicated that the improved drilling fluid was equally effective under more extreme conditions.

The organic jellifying materials that are useful for the purpose at hand are subject to bacterial decomposition and liquefaction either by spores taken up from the air or by inoculation with bacteria. This feature makes a drilling fluid comprised of an organic jellifying material particularly suitable for use in many wells. For example, minor producing zones are often drilled through in the hope that a more productive stratum will be encountered at a lower level. Ordinarily when conventional drilling muds are employed in drilling such wells the production from the minor strata can not be obtained after the well has been completed, for the reasons aforementioned. However, if a drilling fluid is used comprising an organic jellifying material to which has been added a bacterial organism that will effectively convert the organic jellifying material into a mobile liquid, the well may be completed and the production afterwards obtained from all of the various producing strata. This is possible because the organic jellifying material upon decomposing causes the mud lining containing it to disintegrate and slough away from the well bore, after which it may be removed from the well by bailing or otherwise leaving the producing strata free to flow unhindered by mud effects.

Control of the time of decomposition of the jellifying material may be had by selecting the proper quantity and type of bacteria to be added. Inasmuch as the rate of liquefaction of the jelly depends upon the nature of the bacteria and that of the organic jellifying material as well as the proportions, the amount of bacteria to be mixed with a given amount of jellifying material is best determined by laboratory test. From 10 hours to several days may elapse before complete liquefaction occurs. In selecting suitable bacteria or micro-organisms for the decomposition of the organic jellifying material those capable of living at the temperatures encountered in the earth formations are used. The following table lists illustrative examples of micro-organisms capable of converting the jelly into a liquid and the temperatures (T) at which they are most active.

| Micro-organism | T in ° F. of maximum activity |
| --- | --- |
| Bacillus subtillis | 97–133 |
| Bacillus petasitis | 95–122 |
| Bacillus megatherium | 95–122 |
| Bacillus albolactis | 95–122 |
| Bacillus ruminatus | 95–122 |
| Bacillus viridilum | 144–158 |

If on the other hand it is desirable to use a drilling fluid having non-penetrating characteristics which is not decomposed or disintegrated by bacteria, as when drilling through a porous formation where loss of circulation may occur due to penetration into the formation of the fluid suspending the mud, the jelly solution may be sterilized by the addition of suitable disinfecting chemicals so as to prevent its decomposition by bacteria. As a result, there is obtained a non-penetrating drilling fluid having stable characteristics over long periods of time. Some of the materials that we have found suitable to prevent the decomposition and liquefaction of the mixture are mercuric chloride, iodine, and the chloro-phenyl phenates, when added thereto in the concentrations of from 0.25 to 2.0 per cent by weight based on the weight of the jellifiable solution formed with the sterilized jellifying material. If desired, a wall lining, formed during the drilling of a well by a drilling fluid comprising a sterilized organic jellifying material, may be removed from the walls of the well bore by subjecting the organic jellifying material to hydrolysis. The hydrolysis may be effected in the bore by maintaining certain chemical agents, such as solution of sodium hypochlorite or strong mineral acids, in contact with the lining for a suitable length of time. Usually from one to two hours will completely decompose the organic jellifying material and cause disintegration and sloughing of the mud lining, so that it can be removed from the well by bailing.

Other modes of applying the principle of our invention may be employed instead of those explained, change being made as regards the method and compositions herein disclosed, provided the step or steps or composition stated by any of the following claims be employed.

We therefore particularly point out and distinctly claim as our invention:

1. In a method of drilling a well wherein a drilling fluid is used, the steps which comprise supplying to the drill in the bore an aqueous dispersion of an organic jellifying material, and subsequently introducing into the well bore a strong mineral acid.

2. In a method of drilling a well wherein a drilling fluid is used, the steps which comprise supplying to the drill in the bore a mud-laden fluid containing an aqueous dispersion of an organic jellifying material, and subsequently introducing into the well bore a strong mineral acid.

3. In a method of drilling a well wherein a drilling fluid is used, the steps which comprise supplying to the drill in the bore an aqueous dispersion of an organic jellifying material, and subsequently introducing into the well bore a solution of sodium hypochlorite.

4. In a method of drilling a well wherein a drilling fluid is used, and steps which comprise supplying to the drill in the bore a mud-laden fluid containing an aqueous dispersion of an organic jellifying material, and subsequently introducing into the well bore a solution of sodium hypochlorite.

5. In a method of drilling a well wherein a drilling fluid is used, the steps which comprise supplying to the drill in the bore a mud laden fluid containing an aqueous dispersion of an organic jellifying material and a sterilizing agent capable of preventing the bacterial decomposition of the organic jellifying material, and subsequently introducing into the well bore an agent capable of hydrolyzing the organic jellifying material to produce a mobile liquid, whereby the drilling mud is caused to slough away from the bore walls.

DANA G. HEFLEY.
JOHN G. STAUDT.